3,687,814
LINCOMYCIN PRODUCTION
Dennis F. Witz, Kalamazoo, Mich., assignor to
The Upjohn Company, Kalamazoo, Mich.
No Drawing. Filed Aug. 28, 1970, Ser. No. 67,965
Int. Cl. C12d 9/00
U.S. Cl. 195—80 R                                    6 Claims

ABSTRACT OF THE DISCLOSURE

Microbiological process for preparing the antibiotic lincomycin wherein the concomitant production of lincomycin B (4'-depropyl-4'-ethyllincomycin) is significantly reduced by the addition of an effective amount of one or more of the following L-tyrosine compounds: L-dihydroxyphenylalanine (L-dopa), L-tyrosine, natural biological precursors of L-tyrosine, for example, shikimic acid and 4-hydroxyphenylpyruvate, alkyl and phenyl ester derivatives of tyrosine, 4-O-alkyl or 4-O-phenyl ethers of L-tyrosine, 4-O-acylates of tyrosine, and amide derivatives of L-tyrosine to the fermentation medium. The reduction of lincomycin B in the fermentation beer results in increased lincomycin recovery from the fermentation beer.

BRIEF SUMMARY OF THE INVENTION

Lincomyin is a useful antibiotic produced by a fermentation process using the microorganism *Streptomyces lincolnensis* var. *lincolnensis*. In U.S. Pat. 3,086,912 there is described a fermentation and recovery process for the production of lincomycin, formerly known as lincolnensin. Lincomycin B, a nitrogenous base having the molecular formula $C_{17}H_{32}N_2O_6S$, is concomitantly produced in the lincomycin fermentation. U.S. Pat. 3,359,164 discloses the recovery of lincomycin B from lincomycin fermentations, such as described in U.S. Pat. 3,086,912. Though lincomycin and lincomycin B have activity against essentially the same spectrum of microorganisms, it is known that lincomycin B is significantly less active against said microorganisms that is lincomycin. Accordingly, lincomycin is the preferred antibiotic.

The microbiological process of the subject invention comprises the use of an effective amount of a compound selected from the class consisting of L-dopa, L-tyrosine, alkyl and phenyl esters of tyrosine of the formula:

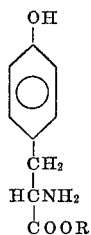

I wherein R is alkyl of 1 through 16 carbon atoms or phenyl; 4-O-alkyl or 4-O-phenyl ethers of tyrosine of the formula:

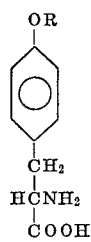

II wherein R is as given above; 4-O-acylates of tyrosine of the formula:

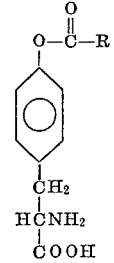

III wherein R is as given above; tyrosine amide of the formula:

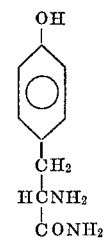

IV and tyrosine-N-acylates of the structure:

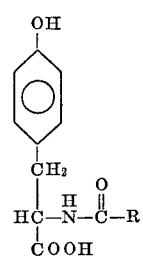

V wherein R is as given above, and natural biological precursors of L-tyrosine, for example shikimic acid and 4-hydroxyphenylpyruvate, in a lincomycin fermentation medium, such as disclosed in U.S. Pat. 3,086,912, to reduce the level of lincomycin B in the fermentation beer. This reduction of lincomycin B in the fermentation beer facilitates the recovery of lincomycin which then leads to higher recovery yields of lincomycin from said beers. A decrease of the lincomycin B content in fermentation beers to 4% or less results in a gain of about 10% of lincomycin in the crystallization step. (The fermentation beers of a controlled fermentation as described in Example 1 of U.S. 3,086,912 will contain approximately 7–9% lincomycin B.)

DETAILED DESCRIPTION

Upon adding an effective amount of L-tyrosine to the fermentation medium of Example 1 in U.S. Patent 3,086,912 there results a reduction in the fermentation production of lincomycin B without a reduction in the production of lincomycin. In addition to the use of L-tyrosine, the reduction of lincomycin B production can be realized by the incorporation of other compounds, listed above, in the fermentation medium of Example 1 in U.S. Patent 3,086,912. For convenience, the detailed description following will concern itself primarily with the use of L-tyrosine, although it is understood that the other compounds can be substituted for L-tyrosine to achieve comparable results. In addition, mixtures of these aforementioned compounds can be used.

The lincomycin fermentation of the subject invention can be conducted with variants and/or mutants of the culture deposited and given the repository designation NRRL 2936. This culture also has the deposit designation NCIB 9413, given by the well-known culture repository in Scotland.

L-tyrosine and the acidic and basic tyrosine compounds of this invention can be added to the fermentation medium as the free acid or as a salt, for example as a sodium or HCl salt. The pH of the fermentation medium will determine the ionic form of the compound. The tyrosine compounds can be added to the fermentation medium before inoculation or can be added as a single dose during the fermentation. If desired, the compounds can be added as feeds during the course of the fermentation between 0 and 6 days.

The effective amount of the L-tyrosine compounds which can be added to the lincomycin fermentation can be varied from about 0.5 g./l. to about 4 g./l., preferably about 2–4 g./l. It has been found that the effective amount of L-tyrosine will vary with media ingredients employed and that lincomycin synthesis is not detrimentally influenced by levels up to 4 g./l. At the higher level of addition lincomycin B is reduced to about 1%. A normal fermentation, as described in Example 1 of U.S. 3,089,912, contains approximately 7–9% lincomycin B. The effect of the L-tyrosine compounds on the reduction of lincomycin B synthesis is greatest if the pH of the fermentation during the period of lincomycin production is from about pH 4.7 to about pH 5.3, preferably at about pH 5. Such pH values during lincomycin production can be brought about by the addition of acid, for example hydrochloric or sulfuric acid, or base, for example sodium hydroxide or sodium bicarbonate or carbonate, to the fermentation on demand. Alternatively, the composition of the fermentation medium can be adjusted, according to the art, to maintain such pH values during lincomycin production.

Examples of alkyl of from 1 to 16 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, and the isomeric forms thereof.

The above esters, ethers and acylates of tyrosine can be prepared as discussed, with references, in E. Schroeder and K. Luebke, "The Peptides," vol. I, Academic Press, New York (1965), especially p. 222 ff.

Natural biological precursors of L-tyrosine, for example shikimic acid and 4-hydroxyphenylpyruvate, are operable as feed compounds in this invention since they are converted to L-tyrosine in the metabolism of the organisms.

The following examples are illustrative of the process of the present invention but are not to be construed as limiting. All percentages of material used are by weight unless otherwise indicated.

Example 1

A soil slant of *Streptomyces lincolnensis* var. *lincolnensis*, NRRL 2936, is used to inoculate a series of 500-ml. Erlenmeyer flasks each containing 100 ml. of seed medium consisting of the following ingredients:

| | Gms. |
|---|---|
| Yeastolac [1] | 10 |
| Glucose monohydrate | 10 |
| NZ-Amine B [1] | 5 |
| Tap water, q.s. 1 l. | |

[1] Yeastolac is a protein hydrolysate of yeast cells and NZ-Amine B is Sheffield's enzymatic digest of casein.

The seed medium presterilization pH is 7.3. The seed is grown for 2 days at 28° C. on a Gump rotary shaker operating at 250 r.p.m.

A 5% inoculum of the seed described above (5 ml.) is added to each of thirty 500-ml. Erlenmeyer flasks each containing 100 ml. of the following fermentation medium:

| | Gms. |
|---|---|
| Glucose monohydrate | 20 |
| Molasses | 20 |
| Corn steep liquor | 20 |
| Wilson's peptone liquor No. 159 [1] | 10 |
| Calcium carbonate | 4 |
| Tap water, q.s. 1 l. | |

[1] Wilson's peptone Liquor No. 159 is a preparation of enzymatically hydrolyzed proteins from animal origin.

The pH of the medium after two days of fermentation is adjusted to pH 5.0 by the addition of acid, for example HCl or $H_2SO_4$. L-tyrosine is added to the fermentation flasks after two days of fermentation. The level of L-tyrosine is varied from 0 g./l. to 10 g./l. During fermentation the pH is kept at about 5.0 by addition of acid, for example HCl or $H_2SO_4$, on demand. The shake flasks are harvested after 3–10 days of fermentation at 28° C. on a Gump rotary shaker at 250 r.p.m. The percent lincomycin B present in the fermentation beers is determined by gas-liquid phase chromatography according to the methods described by R. L. Houtman, D. G. Kaiser, and A. J. Taraszka, J. Pharm. Sci. 57:693 (1968).

Example 2

Production of lincomycin B drops from about 11% to about 0.1% of total lincomycin compounds when about 4 g./l. of L-tyrosine, or derivatives thereof, or other compounds disclosed herein as usable in the subject process, are added to the medium. A listing of compounds added to a lincomycin fermentation, and percent lincomycin B in the fermentation is as follows:

| Compound | Grams/liter added to lincomycin fermentation | Percent lincomycin B* |
|---|---|---|
| None | 0 | 8.5 |
| Do | | 8.8 |
| L-tyrosine | 2 | 8.7 |
| | 3 | 6.9 |
| | 4 | 0.7 |
| L-dopa | 2 | 2.7 |
| | 3 | 0.5 |
| Methyl ester | 0.5 | 10.9 |
| L-tyrosine·HCl | 1.0 | 9.9 |
| | 2.0 | 10.6 |
| | 3.0 | 0.5 |
| | 4.0 | 0.2 |
| | 4.0 | 0.1 |
| Ethyl ester | 0.48 | 10.6 |
| L-tyrosine HCl | 0.94 | 9.3 |
| | 1.9 | 7.6 |
| | 2.8 | 0.6 |
| | 3.8 | 0.4 |
| | 4.0 | 0.3 |
| | 4.0 | 0.2 |

*As percent of total lincomycin compounds produced.

Example 3

Upon substituting *Streptomyces lincolnensis* var. *lincolnensis*, NCIB 9413 in Example 1, for the microorganism designated NRRL 2936, there is obtained comparable fermentation results as expressed in Example 1.

I claim:

1. A microbiological process for preparing the antibiotic lincomycin, wherein the concomitant production of lincomycin B is reduced, which comprises adding an effective lincomycin B inhibiting amount of a compound selected from the class consisting of L-dopa, L-tyrosine, alkyl and phenyl esters of tyrosine of the formula:

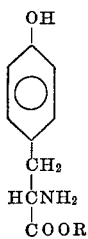   I wherein R is alkyl of 1 through 16 carbon atoms or phenyl; 4-O-alkyl or 4-O-phenyl ethers of tyrosine of the formula:

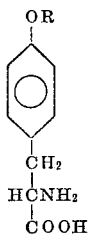   II wherein R is as given above; 4-O-acylates of tyrosine of the formula:

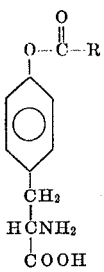   III wherein R is as given above; tyrosine amide of the formula:

   IV and tyrosine-N-acylates of the structure:

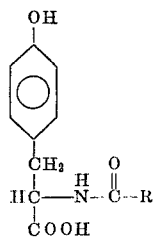   V wherein R is as given above, and natural biological precursors of L-tyrosine selected from the class consisting of shikimic acid and 4-hydroxyphenylpyruvate, to a lincomycin fermentation using the microorganism *Streptomyces lincolnensis* var. *lincolnensis*.

2. A process, according to claim 1, wherein L-tyrosine is added to said fermentation.

3. A process, according to claim 1, wherein L-dopa is added to said fermentation.

4. A process, according to claim 1, wherein the methyl ester of L-tyrosine as the hydrochloride salt is added to said fermentation.

5. A process, according to claim 1, wherein the ethyl ester of L-tyrosine as the hydrochloride salt is added to said fermentation.

6. A process, according to claim 1, wherein the effective amount of tyrosine compound added to a lincomycin fermentation is in a range of about 0.5 to 4 g./l.

References Cited

UNITED STATES PATENTS 3,086,912    4/1963    Bergy et al. _____ 195—80 R X

OTHER REFERENCES

Margerlein et al.: Lincomycin V Amino Acid Fragment, J.A.C.S., 89:10, May 10, 1967, pp. 2459–2464.

JOSEPH M. GOLIAN, Primary Examiner